Aug. 24, 1926.

E. E. PINKERTON 1,597,287

SANITARY COLLAPSIBLE INSECT TRAP

Filed Feb. 9, 1925

INVENTOR
E. E. PINKERTON
BY
ATTORNEYS

Patented Aug. 24, 1926.

1,597,287

UNITED STATES PATENT OFFICE.

EDWARD E. PINKERTON, OF CHICAGO, ILLINOIS.

SANITARY COLLAPSIBLE INSECT TRAP.

Application filed February 9, 1925. Serial No. 8,025.

My invention relates to improvements in sanitary collapsible fly traps, and it consists in the combinations constructions and arrangements herein described and claimed.

An object of my invention is to provide a sanitary insect trap in which the fly paper is entirely concealed, and yet is so constructed as to provide a number of openings through which the flies may gain entrance to the fly paper.

A further object of my invention is to provide a sanitary insect trap in which novel means is provided for holding the fly paper in a flat plane, the holder being constructed so as to be removable from the fly trap, whereby the fly paper in the holder may be changed at will.

A further object of my invention is to provide a sanitary insect trap in which the openings in the container may be arranged so as to spell the word "Flytrap", thus providing a novel means for advertising the device.

A further object of my invention is to provide a device of the type described in which the holder and trap are constructed so as to be folded into a flat plane for shipment.

A further object of my invention is to provide a device of the type described that is extremely simple in construction, durable and efficient for the purpose intended.

Other objects and advantages will appear in the following specification, and the novel features of the invention will be particularly pointed out in the appended claims.

Figure 1:
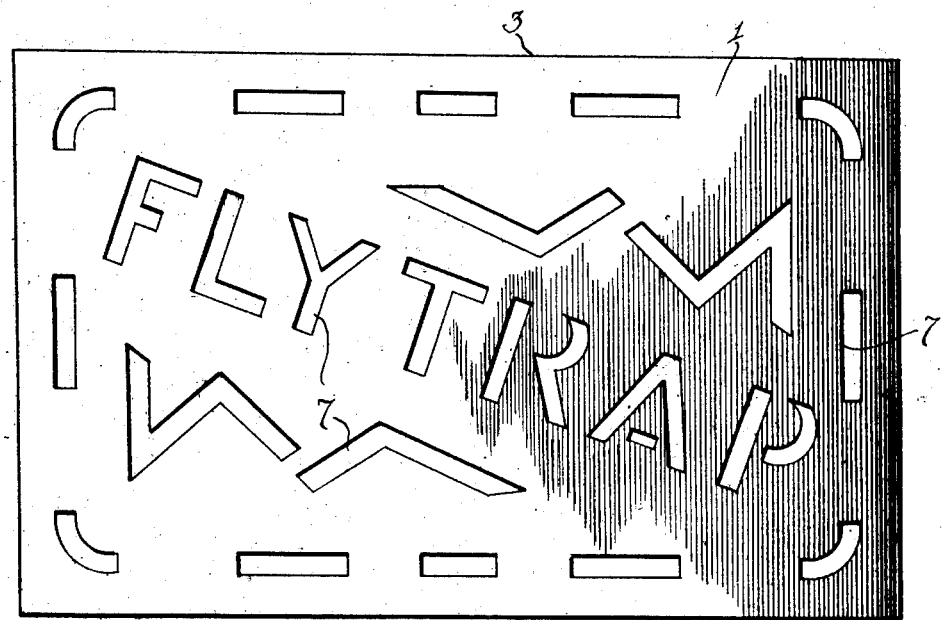
Figure 2:
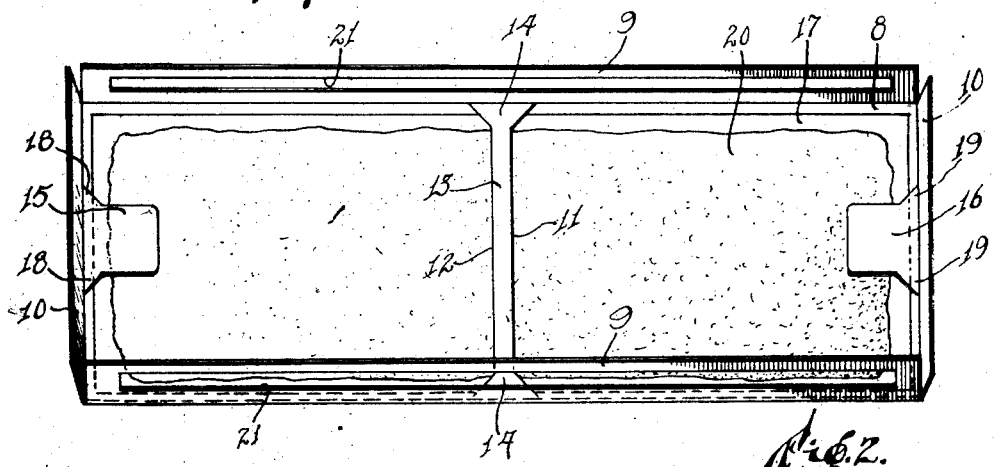
Figure 3:
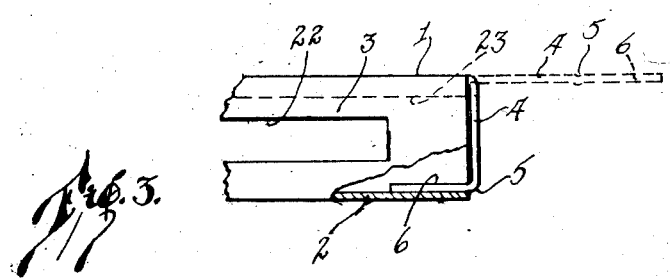

My invention is illustrated in the accompanying drawings forming part of this application, in which Figure 1 is a plan view of the device, Figure 2 is a perspective view of the holder, and Figure 3 is an enlarged sectional view of a portion of the device.

Great difficulty is experienced in keeping fly paper away from articles, due to the fact that the paper, after it becomes heated, is inclined to curl so as to bring the sticky side of the paper into contact with the surface of the article disposed adjacent thereto. Moreover, the fly paper presents an unsightly appearance after a number of flies have been caught.

With these objects in view, I have designed a fly trap in which the fly paper is entirely concealed, and in which novel means is provided for holding the fly paper in a flat plane. The trap itself comprises a cardboard box, or a box made of similar material, the box being constructed so as to be collapsible into a flat plane, whereby it may be readily shipped. The trap contains a holder that is especially designed to retain a piece of fly paper in a flat plane. The holder is removably disposed in the trap whereby a new piece of fly paper may be substituted for the used piece, this change being accomplished by merely removing the holder from the trap and then substituting the new piece of fly paper for the one used.

In Figures 1 and 3 I clearly show the construction of the fly trap. As heretofore stated, the trap is preferably made of cardboard, although it can be made of any other material desired. The trap is composed of a top 1, a bottom piece 2, and side pieces 3. A cross section through the box resembles a parallelogram which may be collapsed so as to bring the top 1 and bottom 2 into contact with each other, whereby the box may be readily shipped.

The box is also provided with flaps 4 at each end thereof. These flaps are bent at 5 so as to dispose the portions 6 thereof inside of the box when the box is swung into operative position. As stated, there are two flaps 4 provided. These flaps not only close the ends of the trap, but also support the trap and prevent the wall 1 from falling down upon the bottom 2.

The top 1 is provided with a number of openings 7 through which the flies or other insects are permitted to gain entrance to the fly paper. In the present instance I have shaped certain of these openings so as to spell the word "Flytrap". In this way the openings not only permit the insects to gain entrance to the trap, but also provide a novel means for advertising or describing the device.

The holder is clearly shown in Figure 2, and consists of a bottom piece 8, side walls 9 and end walls 10. A cut 11 and a cut 12 are made along the bottom 8 so as to provide a strip 13 that extends entirely across the width of the holder. As clearly shown in Figure 2, the ends of the strip 13 are widened as at 14 in order to make the connection between the strip and the box more durable. Flaps 15 and 16 are also cut from the bottom 8 and are adapted to overlie the fly paper 17. The flaps 15 and 16 are provided with wing-shaped portions 18 and 19 whereby the flaps are reenforced.

The fly paper 17 is of any standard construction, and as is usually the case is provided with a layer of sticky substance 20 that extends substantially across the entire surface of the fly paper. This is clearly shown in Figure 2. The fly paper is disposed beneath the strip 13 and the flaps 15 and 16, and the sticky substance 20 causes the fly paper to adhere to the strip and flaps. In this manner the fly paper is held in a flat position. The sides 9 of the holder have slots 21 therein that extend substantially the entire length of the holder. When the holder is disposed in the trap, the slots 21 are aligned with the slots 22 in the sides 3 of the trap. The slots 21 and 22 provide a further means of entrance for the insects, into the trap.

From the foregoing description of the various parts of the device the operation thereof may be readily understood. The trap and holder are shipped before the fly paper is disposed within the trap. The holder may be collapsed into a flat plane, this being accomplished by merely swinging the sides 9 and the ends 10 down upon the bottom 8 of the holder. It has already been explained how the trap may be collapsed into a flat plane. As will be readily apparent, the trap may be readily collapsed as soon as the flaps 4 are swung into the dotted line position shown in Fig. 3. The trap may then be folded so as to take up no more room than that shown between the dotted line 23 and the top 1 (see Fig. 3). The folded trap and the folded holder may be shipped in an envelope or other light container. The party receiving the device first swings the sides 9 and the ends 10 of the holder into the position shown in Figure 2. The piece of fly paper is then threaded beneath the strip 13 and is also disposed beneath the flaps 15 and 16. A slight pressure upon the strip 13 and the flaps 15 and 16 will cause the strip and flaps to adhere to the fly paper 17, and hold the latter in position. The holder with the fly paper is now inserted in the trap casing. After this has been done the entire holder is concealed by merely swinging the flaps 4 into the full line position shown in Figure 3. The device is now ready for use and may be placed in almost any part of the house or building desired.

When it is necessary to substitute a new strip of fly paper for the one used, the soiled strip is first severed from the holder by cutting along the edges of the strip 13 and the flaps 15 and 16. This frees the soiled strip of fly paper from the holder. The new strip may now be threaded beneath the strip 13 in the same manner as heretofore described, and is held in place by means of the flaps 15 and 16. The trap casing will last an indefinite time, as will also the holder. The only change necessary is to supply a new piece of fly paper for the old one from time to time. The strip 13 prevents the fly paper 17 from buckling at its center and thus holds the sticky portion 20 away from the under surface of the top 1.

I claim:

1. A collapsible insect trap comprising a top, bottom and sides, said top having openings therein to permit insects to gain entrance to the trap, said sides permitting said top to be folded down upon said bottom, and end flaps removably secured in place for supporting said insect trap in operative position.

2. An insect trap comprising a casing having openings in the top and side walls thereof, a holder removably disposed in said insect trap, said holder having sides for spacing the bottom of said holder away from the top of said casing, said holder having openings in the sides thereof, for registering with the openings in the sides of said casing.

3. A collapsible insect trap comprising a casing having a top, bottom, and side walls, said top and said side walls having openings therein, the openings in said top spelling the name of the device, a holder removably disposed in said casing, said holder having side and end walls, fly paper retaining means carried by said holder, and holder retaining flaps carried by said casing, said flaps being foldable into engagement with said holder for securing said holder in place.

4. A sanitary collapsible insect trap comprising a casing, a holder removably disposed in said casing, said holder being adapted to carry a sheet of fly paper, and collapsible means carried by said holder for spacing the fly paper from the casing.

5. An insect trap comprising a collapsible casing, a holder for fly paper removably carried by said casing, and collapsible means carried by said casing for securing said casing in operative position and for retaining said holder in said casing.

EDWARD E. PINKERTON.